July 16, 1968 J. A. VALLEÉ 3,393,367

CIRCUIT FOR GENERATING TWO CONSECUTIVE SAME-DURATION PULSES, EACH ON SEPARATE OUTPUT TERMINALS, REGARDLESS OF TRIGGERING-FULSE DURATION

Filed Dec. 8, 1965

2 Sheets-Sheet 1

Inventor:
JOHNNY A. VALLEÉ

By Samuel Cohen
Attorney

July 16, 1968 J. A. VALLEÉ 3,393,367

CIRCUIT FOR GENERATING TWO CONSECUTIVE SAME-DURATION PULSES, EACH ON SEPARATE OUTPUT TERMINALS, REGARDLESS OF TRIGGERING-PULSE DURATION

Filed Dec. 8, 1965 2 Sheets-Sheet 1

| X | Y | Z | Z̄ |
|---|---|---|---|
| 1 | 0 | 1 | 0 |
| 0 | 1 | 0 | 1 |
| 0 | 0 | φ | φ |

Inventor:
JOHNNY A. VALLEÉ
BY Samuel Cohen
Attorney

United States Patent Office 3,393,367
Patented July 16, 1968

3,393,367

CIRCUIT FOR GENERATING TWO CONSECUTIVE SAME-DURATION PULSES, EACH ON SEPARATE OUTPUT TERMINALS, REGARDLESS OF TRIGGERING-PULSE DURATION

Johnny A. Vallee, Juno Beach, Fla., assignor to Radio Corporation of America, a corporation of Delaware
Filed Dec. 8, 1965, Ser. No. 512,420
7 Claims. (Cl. 328—62)

This invention relates to new and improved circuits for generating two consecutive pulses. Such circuits are commonly used in the input-output control modules of data processing machines although they are not restricted to such use.

The object of the invention is to provide two pulse generator circuits which are insensitive to the duration of a triggering pulse.

The circuits of the invention include first and second bistable circuit elements, such as flip-flops, each in an initial stable state. A logic circuit responsive to an input bit of one value and to the initial state of the first flip-flop, switches the second flip-flop to its other stable state. Means, including delay means, responsive to the switching of the second flip-flop to its other stable state, switches the first flip-flop to its other stable state and the second flip-flop back to its initial stable state, both after the interval $\Delta t$ inserted by the delay means. The two output pulses from the circuit are available, one at an output terminal of the second flip-flop and the other at the output terminal of the delay means.

The invention is discussed in greater detail below and is shown in the following drawings of which:

The blocks in the various figures represent electrical circuits which receive inputs representing binary digits (bits) and which produce one or more outputs representing bits. For purposes of the present discussion, it is assumed arbitrarily that a relatively high voltage level represents the bit one and a relatively low level represents the bit zero. For the sake of brevity in the explanation which follows, it is sometimes stated that a bit, rather than a signal representing a bit, is applied to or produced by a circuit.

Figure 1:
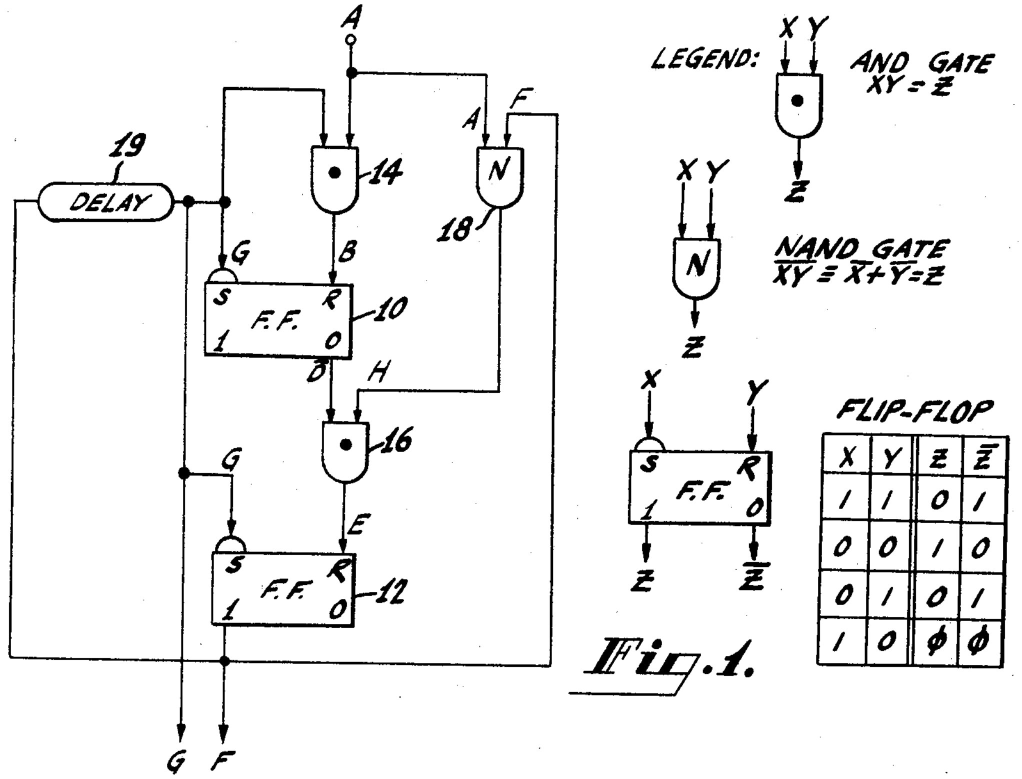
FIGURE 1 is a block circuit diagram of one form of the present invention.

The circuit of FIGURE 1 includes two flip-flops 10 and 12 and two AND gates 14 and 16. The F or 1 output of flip-flop 12 is fed back to one input terminal of NAND gate 18 and through delay means 18 to the set (S) terminal of flip-flops 10 and 12 and to one input terminal of AND gate 14. The input trigger signal A is applied to the other input terminal of AND gate 14 and the other input terminal of NAND gate 18. The output B of AND gate 14 is applied to the reset (R) terminal of flip-flop 10. The $\overline{D}$ or 0 output of flip-flop 10 and the H output of NAND gate 18 are applied to AND gate 16. The output E of AND gate 16 is applied to the reset terminal of flip-flop 12.

The Boolean equations defining the operation of the AND and NAND gates and the truth table describing the operation of the flip-flop of FIGURE 1 appear under the "legend" of FIGURE 1. (The $\phi$ in the flip-flop table means that the value remains the same.) The operation of the NAND gate is also defined in Table 1 below.

TABLE 1

| X | Y | Z |
|---|---|---|
| 0 | 0 | 1 |
| 0 | 1 | 1 |
| 1 | 0 | 1 |
| 1 | 1 | 0 |

Figure 2:
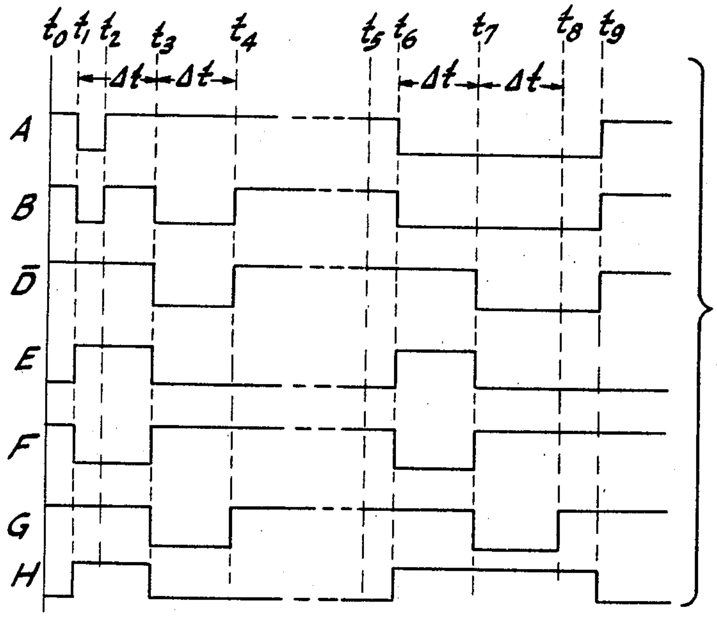
FIGURE 2 is a drawing of waveforms present in the circuit of FIGURE 1.

The operation of the circuit of FIGURE 1 is given in Tables 2 and 3 below and is illustrated in FIGURE 2. Table 2 sets forth the operation of the circuit when the trigger pulse A is relatively short—shorter than $\Delta t$, the delay inserted by the delay means 18. Table 3 sets forth the operation of the circuit of FIGURE 1 when the trigger pulse A is relatively long—longer than $2\Delta t$. The number sign appearing in certain boxes in the tables indicates a change in value.

TABLE 2

| | $t_0$ | $t_1$ | $t_2$ | $t_3$ | $t_4$ |
|---|---|---|---|---|---|
| A | 1 | #0 | #1 | 1 | 1 |
| B | 1 | #0 | #1 | #0 | #1 |
| $\overline{D}$ | 1 | 1 | 1 | #0 | #1 |
| E | 0 | #1 | 1 | #0 | 0 |
| F | 1 | #0 | 0 | #1 | 1 |
| G | 1 | 1 | 1 | #0 | #1 |
| H | 0 | #1 | 1 | #0 | 0 |

TABLE 3

| | $t_5$ | $t_6$ | $t_7$ | $t_8$ | $t_9$ |
|---|---|---|---|---|---|
| A | 1 | #0 | 0 | 0 | #1 |
| B | 1 | #0 | #0 | 0 | #1 |
| $\overline{D}$ | 1 | 1 | #0 | 0 | #1 |
| E | 0 | #1 | #0 | 0 | 0 |
| F | 1 | #0 | #1 | 1 | 1 |
| G | 1 | 1 | #0 | #1 | 1 |
| H | 0 | 1 | 1 | 1 | #0 |

As may be observed from the tables and from FIGURE 2, flip-flop 10 initially is reset and flip-flop 12 initially is set, that is, $\overline{D}$ initially is 1 and F initially is 1. The signal A and the feedback signal G are both initially 1 and therefore B, the output of AND gate 14, is also 1. The two inputs A and F to NAND gate 18 are both 1 and therefore its output H is 0. The input $\overline{D}$ to AND gate 16 is 1 and its second input H is 0. Therefore AND gate 16 produces an output $E=0$. It might be mentioned here that when the set and reset inputs to a flip-flop are 1 and 0, respectively, as is the initial signal condition for flip-flop 12, or 0 and 1, respectively, the flip-flop state remains unchanged.

At time $t_1$, the value of signal A changes from 1 to 0. This disables AND gate 14 causing its output to change to 0. The $A=0$ applied to NAND gate 18 causes its output H to change to 1. The two inputs $\overline{D}$ and H to AND gate 18 are now both 1 causing its E output to change to 1. The two inputs G and E to flip-flop 12 are now both 1 causing this flip-flop to reset and the F output to change to 0.

Assume now that the pulse A is relatively short, as shown in the left part of FIGURE 2 and in Table 2. At time $t_2$, A changes from 0 back to 1. The two inputs G and B to flip-flop 10 are now both 1. This tends to place the flip-flop in its reset condition; however, flip-flop 10 is already reset so that $\overline{D}$ retains its value of 1.

After the interval $\Delta t$ inserted by the delay means 19, that is, at time $t_3$, G changes to 0. This disables AND gate 14 causing its output B to change to 0. The two inputs G and B to flip-flop 10 are now both 0 causing flip-flop 10 to become set and $\overline{D}$ to change to 0. The output E of AND gate 16 thereupon changes to a 0. The two inputs G and E to flip-flop 12 are now both 0 causing flip-flop 12 to become set and F to change to 1. As F and A are both 1, H, the output of NAND gate 18, changes to 0.

After a second interval $\Delta t$, that is, at time $t_4$, the delay means 18 produces an output $G=1$. The second input A to AND gate 14 is also a 1 so that it produces an output $B=1$. The two inputs G and B to flip-flop 10 are now both 1 causing flip-flop 10 to reset and $\overline{D}$ to change to 1. The circuit has now returned to its original state, that is, flip-flop 10 reset and flip-flop 12 set.

The outputs from the circuit of FIGURE 1 are F and G. These two pulses are consecutive and both have the same duration, namely $\Delta t$. The pulses are negative pulses, that is, each represents the bit 0.

The operation of the circuit when the trigger pulses A is relatively long is succinctly given both in Table 3 and in the right part of FIGURE 2. As shown both in the table and the figure, the consecutive pulses F and G are still of the same duration $\Delta t$ and still occur consecutively. The operation of the circuit set forth in Table 3 readily can be followed from the table.

Figure 3:
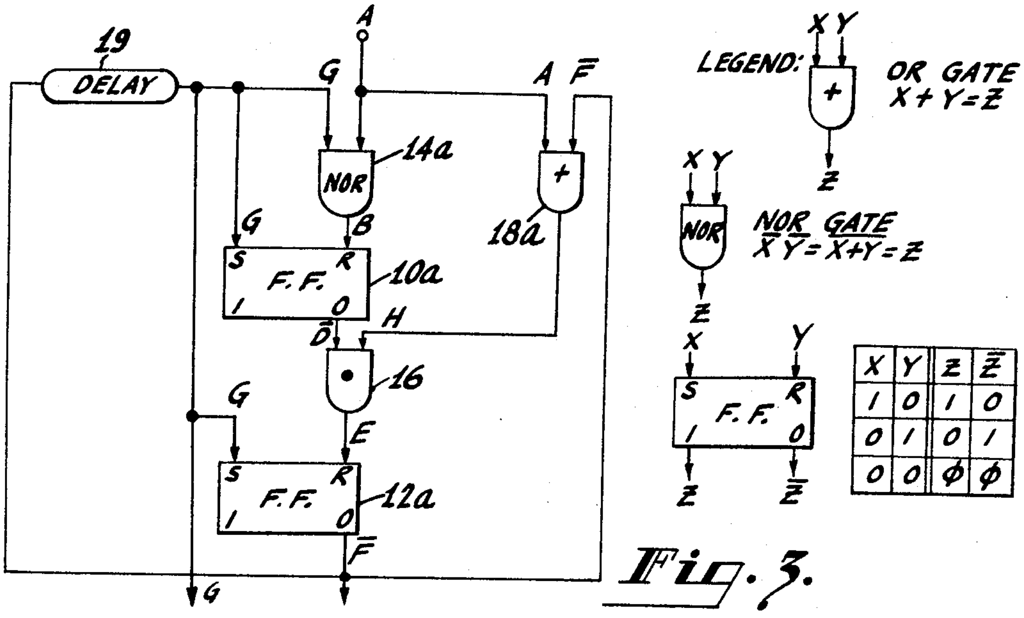
FIGURE 3 is a block circuit diagram of another form of the invention.

While the circuit of FIGURE 1 employs AND gates and a NAND gate, it is possible, with minor circuit modification, to employ other types of logic gates instead. For example, the circuit of FIGURE 3 employs a NOR gate **14*a* in place of AND gate 14 and an OR gate 18*a* in place of NAND gate 18. In addition, the output $\overline{F}$ of flip-flop 12*a* is employed rather than the F output of the corresponding flip-flop 12** of FIGURE 1. In addition, the convention adopted for the flip-flops of FIGURE 3 is somewhat different from that employed for the flip-flop of FIGURE 1, as should be clear from the legend of FIGURE 3. The legend indicates that the flip-flops of FIGURE 3 are set by applying a 1 to the set terminal and a 0 to the reset terminal and are reset by applying a 0 to the set terminal and a 1 to the reset terminal. The application of bits of the same value to the set and reset terminals of these flip-flops does not affect their storage state.

The Boolean equations defining the operation of the OR gate and NOR gate appear in the legend in FIGURE 3. The operation of the NOR gate is also depicted in Table 4 below.

TABLE 4

| X | Y | Z |
|---|---|---|
| 0 | 0 | 1 |
| 0 | 1 | 0 |
| 1 | 0 | 0 |
| 1 | 1 | 0 |

Figure 4:
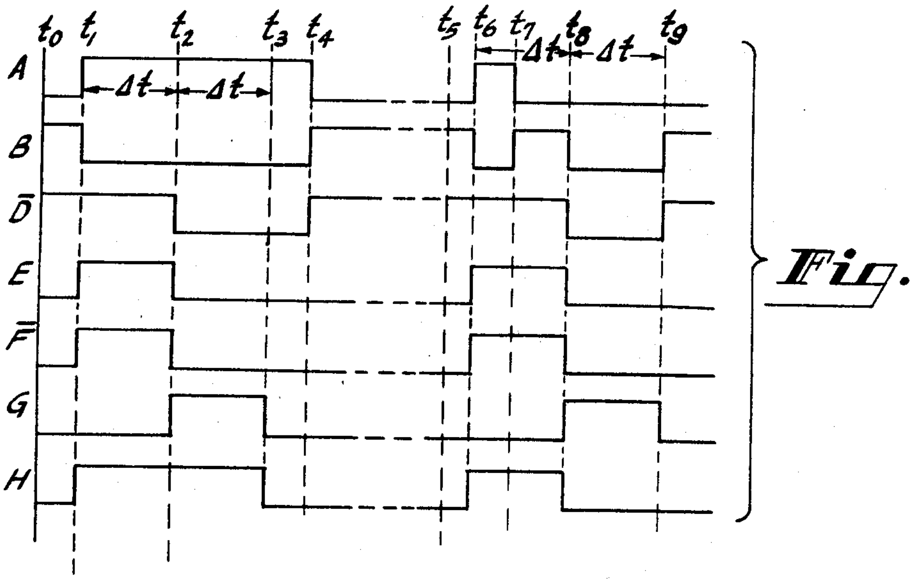
FIGURE 4 is a drawing of waveforms present in the circuit of FIGURE 3.

The operation of the circuit of FIGURE 3 is described by the waveforms of FIGURE 4. The left part of the figure shows the circuit operation when the input pulse A has a duration greater than $2\Delta t$ and the right part of FIGURE 4 shows the circuit operation when the input pulse A has a duration less than $\Delta t$. The former operation is also set forth in Table 5 and the latter operation in Table 6. These tables appear below. As in Tables 2 and 3, the number sign represents a change in value.

TABLE 5

| | $t_0$ | $t_1$ | $t_2$ | $t_3$ | $t_4$ |
|---|---|---|---|---|---|
| A | 0 | #1 | 1 | 1 | #0 |
| B | 1 | #0 | 0 | 0 | #1 |
| $\overline{D}$ | 1 | 1 | #0 | 0 | #1 |
| E | 0 | #1 | #0 | 0 | 0 |
| $\overline{F}$ | 0 | #1 | #0 | 0 | 0 |
| G | 0 | 0 | #1 | #0 | 0 |
| H | 0 | #1 | 1 | 1 | 0 |

TABLE 6

| | $t_5$ | $t_6$ | $t_7$ | $t_8$ | $t_9$ |
|---|---|---|---|---|---|
| A | 0 | #1 | 0 | 0 | 0 |
| B | 1 | #0 | #1 | #0 | #1 |
| $\overline{D}$ | 1 | 1 | 1 | #0 | #1 |
| E | 0 | #1 | 1 | #0 | 0 |
| $\overline{F}$ | 0 | #1 | 1 | #0 | 0 |
| G | 0 | 0 | 0 | #1 | #0 |
| H | 0 | 1 | 1 | #0 | 0 |

As in the arrangement of FIGURE 1, the circuit of FIGURE 3 is insensitive to the duration of trigger pulse A. The circuit of FIGURE 3, however, produces time-sequential positive-going pulses—pulses representing the bit 1, of duration $\Delta t$, whereas the circuit of FIGURE 1 produces time-sequential negative-going pulses of duration $\Delta t$.

In the claims which follow, the NOR and AND gates are sometimes generically referred to as "logical product" gates and the NAND and OR gates are sometimes generically referred to as "logical sum" gates. The term logical product is applicable to an AND gate as its output is the logical product of its inputs (for example $XY=Z$). It is also applicable to a NOR gate as its output is the logical product of the complements of its inputs (for example, $\overline{X}\overline{Y}=Z$). In a similar fashion, the Boolean equation for a two input OR gate is $X+Y=Z$ and for a two input NAND gate is $\overline{X}+\overline{Y}=Z$, both equations describing logical sums.

I claim:

1. A circuit for generating two pulses comprising, in combination:

first and second bistable circuit elements, each in an initial stable state;

a logic circuit responsive to an input representing a bit of one binary value and to the initial state of the first bistable circuit element for switching the second bistable circuit element to its other stable state; and means including delay means which delays an electrical signal applied thereto an interval $\Delta t$, responsive to the switching of the second bistable circuit element to its other stable state for switching the first bistable circuit element to its other stable state and the second bistable circuit element back to its initial stable state, both after said interval $\Delta t$.

2. The circuit set forth in claim 1, and further including:

means, including said delay means and a portion of said logic circuit, responsive to said input representing a bit of the other binary value and to the switching of the second bistable circuit element back to its initial stable state, for switching said first bistable circuit element back to its initial stable state, an interval at least equal to $\Delta t$ after the second bistable circuit element switches back to its initial stable state.

3. A two pulse generator comprising, in combination:

first and second flip-flops, each in an initial stable state;

logic gate means responsive to an input pulse indicative of a bit of one binary value and to the initial state of the first flip-flop for switching the second flip-flop to its other stable state;

means including delay means which delays an electrical signal applied thereto an interval $\Delta t$, responsive to the switching of the second flip-flop to its other stable state for switching the first flip-flop to its other stable state and the second flip-flop back to its initial stable state, both after the interval $\Delta t$ inserted by the delay means; and two output terminals, one comprising an input terminal of said delay means and the other comprising an output terminal of said delay means, for respectively producing time sequential pulses of the same duration.

4. A two pulse generator as set forth in claim 3 and further including:

means, including said delay means and a portion of said logic gate means, responsive to the switching of the second flip-flop back to its initial stable state and a change in said input pulse to represent a bit of the other binary value, for switching said first flip-flop back to its initial stable state, an interval at least equal to $\Delta t$ after the second flip-flop switches back to its initial stable state.

5. The generator set forth in claim 3 in which said logic gate means include logical sum and logical product gate means.

6. A two pulse generator comprising, in combination:

first and second flip-flops each having first and second output terminals and first and second input terminals;

a first two input logical product gate connected at one input to the second output terminal of the first flip-flop and at its output to the second input terminal of the second flip-flop;

a delay means;

a second two input logical product gate;

a two input logical sum gate connected at its output terminal to the other input of the first logical product gate;

a connection from the first output terminal of the second flip-flop directly to one input to the logical sum gate and through the delay means to the first input terminal of the first and second flip-flops, and to one input of the second logical product gate; and means for applying an input indicative of a binary digit to the other input of the second logical product gate and the other input of the logical sum gate.

7. A generator as set forth in claim 6 in which the logical product gates comprise AND gates and the logical sum gate is a NAND gate.

No references cited.

ARTHUR GAUSS, *Primary Examiner.*

J. ZAZWORSKY, *Assistant Examiner.*